United States Patent Office 3,235,499
Patented Feb. 15, 1966

3,235,499
FOAM-INHIBITED OIL COMPOSITIONS
Hans F. Waldmann, Glassboro, N.J., assignor to Socony
Mobil Oil Company, Inc., a corporation of New York
No Drawing. Filed June 11, 1962, Ser. No. 201,310
2 Claims. (Cl. 252—49.6)

This invention relates to the inhibition of foam in oil compositions containing materials which normally tend to promote foaming of the composition. More particularly, the invention relates to such oil compositions to which have been added silicone polymers and special inhibitors.

In the preparation of oil compositions for use as hydraulic fluids, as lubricants and the like, various additives are used to prevent sludging, deposition of gum and resinous materials, or similar objectionable results. These additives are generally in the nature of detergents which are effective for the intended purposes but, characteristically, increase the foaming tendencies of the oil composition. To overcome this problem, silicone polymers have been employed in the prior art with some degree of success. Unfortunately, however, the silicones which do initially suppress foaming, lose their effectiveness in a relatively short period of time. Many materials having been suggested for prolonging the foam-inhibiting action of the silicones with generally indifferent success.

According to the present invention, it has now been found that oil compositions containing detergent additives which promote foaming and silicone polymer antifoamants may be kept substantially foam-free by incorporating into the compositions a small amount of an alkoxylated partial ester formed from a fatty acid having from about 5 to about 25 carbon atoms and an aliphatic alcohol having from 3 to about 6 carbon atoms and containing from 3 to about 6 hydroxyl groups. These compounds, which are referred to hereinafter as inhibitors, are prepared by reacting the partial ester with either ethylene oxide or propylene oxide or a mixture thereof in a proportion to provide a product containing the desired number of ethylene oxide (—CH$_2$CH$_2$O—) or propylene oxide

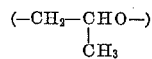

radicals (i.e., mols) per mol of ester therein. A typical reaction, for example, is that between 1 mol proportion of glycerol dilaurate and 3 mol proportions of ethylene oxide

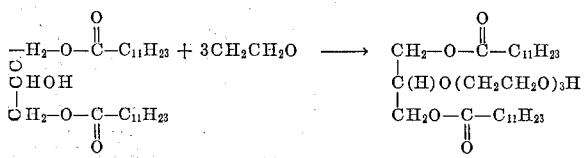

The reaction is generally carried out at elevated temperatures in the presence of a basic catalyst, such as an alkali metal hydroxide. It will be understood that in partial esters containing more than one unesterified hydroxyl group the alkoxylation may occur at one or more or all of such groups. Generally, the reaction is a random one and a single alkoxylated compound is not obtained, but a mixture of alkoxylated compounds, the product in any particular case being identified by the average number of alkylene oxide radicals incorporated into the partial ester.

The partial esters which may be used to prepare the inhibitors of the invention are well known to the art. They are prepared by the partial esterification of polyhydric alcohols, such as glycol, glycerol, erythritol, pentaerythritol, the various isomeric pentitols and hexitols, such as arabitol, adonitol, mannitol, sorbitol, etc. Inner anhydrides of these alcohols, such as sorbitan

are also highly suitable. The fatty acids used to prepare the esters are also well known, any of these acids containing from about 5 to about 25 carbon atoms, including the carboxyl carbon, such as valeric, capyrylic, capric, lauric, myristic, palmitic, stearic, oleic, linoleic, linolinic and hyenic acids, being suitable.

Due to the variety of partial esters from which the inhibitors of the invention may be prepared and the even greater variety of the alkoxylated inhibitor products a classification of these products by means of a generic chemical formula is not feasible. The alkoxylated esters are, therefore, broadly defined herein in terms of the polyhydric alcohols and acids used to prepare the general class of esters and the average number of alkoxide groups contained therein. Since the inhibitor compounds and their manner of preparation are well known to the art, it is considered that this is the most feasible and readily understandable manner of defining them.

Typical partial esters suitable for the invention are the following:

Glycerol monolaurate
Glycerol monostearate
Glycerol dioleate
Erythritol caprylate
Pentaerythritol trioleate
Adonitol trioleate
Sorbitol dilaurate
Sorbitan monostearate
Sorbitan tristearate The alkoxylated partial esters found suitable as inhibitors in the invention may contain from 1 up to about 25 ethylene oxide or propylene oxide groups per mol of the ester.

As is well known, detergent additives commonly used include, for example, oil-soluble metal salts of high molecular weight (300–1000) sulfonic acids such as petroleum-derived sulfonic acids and synthetic alkyl-aryl sulfonic acids having from about 8 to about 24 carbon atoms in the alkyl portion thereof, the alkaline earth metal salts being specifically preferred. As specific examples of such salts there may be mentioned normal and basic calcium and barium petroleum sulfonates and normal and basic (or complex) calcium and barium salts of octyl-, nonyl- and wax-substituted benzene sulfonates.

Another preferred class of detergent are the metal salts of alkyl phenol sulfides, such as, for example, the normal or basic (complex) barium and calcium salts of amyl- and nonyl-substituted phenol sulfide. Such salts are fully described in the prior art. See, for example, U.S. Patents Nos. 2,451,345, 2,362,289 and 2,916,454.

Metal salts of phosphorus sulfide-hydrocarbon reaction products, particularly the alkaline earth metal salts, are also well known oil detergents, especially the barium salts. Specific salts of this character are the P$_2$S$_5$-polyolefin type salts, such as the barium salts of P$_2$S$_5$-polypropylene reaction products. Salts of this type are fully described, for example, in U.S. Patents Nos. 2,316,080, 2,316,082, 2,-316,088 and 2,806,022.

While the foregoing classes of detergent additives have been mentioned as illustrative, it will be appreciated that the principle of the present invention may be successfully applied to any oil composition containing one or more detergents which increase the foaming tendencies thereof. Also, oil compositions containing additional additives along with the foam-inducing additives, such as conventional antioxidants, pour point depressants, extreme pressure agents and the like, may be improved (with respect to their foaming tendencies) by the invention.

The silicone polymers are compounds well known in the art. The dimethyl silicones which are the ones most commonly employed vary widely in molecular weight depending on the length of the polymer chain and are generally characterized by their viscosities as determined at 25° C. These silicones have the general formula:

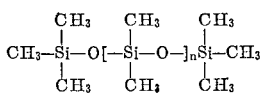

where $n$ is a number having an average value such that the silicone polymer has a viscosity at 25° C. of from about 3.0 to about 1,000,000 cs. and preferably from about 300 to about 100,000 cs. Similar polymers having longer alkyl groups and/or aryl groups are also suitable for the invention.

A full understanding of the invention will be had from the following examples in which all of the percentages given are by weight.

*Examples*

A series of foaming tests was conducted using an oil composition composed of 95.35% of an SAE–50 grade lubricating oil and 4.65% of typical commercial detergent additives as follows: (1) 2% of an oil concentrate (10% Ba) of a complex carbonated barium nonylphenol sulfide; (2) 0.9% of an oil concentrate (9.5% Ba) of a mixture of sulfurized barium alkylphenate and phosphosulfurized polybutene barium salt; (3) 1.0% of an oil concentrate (10% Ba) of a basic barium wax-benzene sulfonate; and (4) 0.75% of an oil concentrate (8% Zn) of zinc dihexyl dithiophosphate. This oil composition (Oil A) was blended with a typical dimethyl silicone polymer alone and with the same silicone polymer and various inhibitors typical of the invention. These compositions were then tested for foam tendency (cc. of foam after 5 minutes aeration) and foam stability (cc. of foam after 10 minutes standing), according to Sequence 1 of ASTM foam test, D–892–46T. The tests were carried out one day after preparation of the various blends (i.e., Oil A plus either silicone or silicone and inhibitor) and were repeated after 14 days and after 75 days. The results of the tests are summarized in Table I in which "EO" with its preceding number represents the average number of ethylene oxide units in the chain of the ethoxylated compound used as the inhibitor and wherein "FT" stands for foaming tendency and "FS" stands for foam stability.

TABLE I

| Inhibitor | Percent inhibitor added | Silicone polymer [1] (p.p.m.) | FT/FS (cm.³) | | |
|---|---|---|---|---|---|
| | | | After 1 day | After 14 days | After 75 days |
| Oil A | None | 2 | 660/610 | 670/610 | |
| Sorbitan monostearate plus 4 EO | 0.3 | 2 | 15/0 | 370/5 | 590/250 |
| Sorbitan tristearate plus 20 EO | 0.2 | 2 | 0/0 | 0/0 | 0/0 |
| Do | 0.1 | 2 | 80/0 | 0/0 | 0/0 |

[1] Dow-Corning Fluid 200, 60,000 cs. at 25° C.

A second series of foaming tests was conducted after the fashion of the preceding series employing an oil composition prepared with the 50–SAE grade base oil used in Oil A and containing three of the additives used in Oil A in the following amounts based on the total composition: 1.5% Additive (1), 1.5% Additive (3) and 0.5% Additive (4). In these tests the 50–SAE grade base oil without additives, the compounded oil (Oil B) and the compounded oil having added thereto varying amounts of the same silicone polymer used in the first test series were tested with the results shown in Table II. The tests were conducted one day after the blends (Oil B plus the silicone) were prepared.

TABLE II

| | Silicone added, p.p.m. | Foam FT/FS (cm.³) |
|---|---|---|
| Base oil (No additives) | None | 400/10 |
| Base oil (No additives) | 1.5 | 0/0 |
| Oil B | None | 670/630 |
| Oil B | 1.5 | 600/500 |
| Oil B | 3.0 | 540/400 |
| Oil B | 4.5 | 530/330 |
| Oil B | 10.0 | 650/480 |

These test results clearly show that although the silicone polymer is an effective foam-inhibitor in the uncompounded oil it is practically ineffective as a foam inhibitor in the compounded oil, even when employed in relatively large amounts.

Portions of Oil B were then mixed with 1.5 p.p.m. of the same silicone polymer and to the mixture was added a small amount of an inhibitor of the invention and these compositions tested for foaming after storage. The results are shown in Table III.

TABLE III

| Inhibitor | Percent inhibitor added | Silicone polymer [1] (p.p.m.) | FT/FS (cm.³) | | |
|---|---|---|---|---|---|
| | | | After 1 day | After 14 days | After 83 days |
| Oil B | None | 1.5 | 660/610 | 670/620 | |
| Sorbitan tristearate plus 20 EO | 0.05 | 1.5 | 30/0 | 0/0 | 0/0 |

[1] Dow-Corning Fluid 200, 60,000 cs. at 25° C.

It will be apparent from the foregoing examples and tests that the inhibitors of the present invention act to prevent any substantial foaming and that such foam as may be formed initially is merely transient and disappears substantially completely before expiration of the 10-minute standing period called for by the standard test. It is considered especially significant that these inhibitors continue to act as foam inhibitors even after as much as 83 days. A further feature of this invention lies in the fact that the inhibitors are effective with even very small amounts of the silicone.

From the standpoint of economy it is, of course, desirable that the amount of inhibitor as well as the amount of silicone polymer added to the oil composition be kept to a minimum. It has been found that as little as 1–2 parts per million of silicone is effective with as little as 0.01% of inhibitor. The amounts of silicone and inhibitor used, however, will depend on the nature and/or amount of the detergent additives present in the oil composition. Generally, the detergent additives are employed in various oil compositions in amounts ranging from about 0.5% to about 30%, usually from 1% to about 5%. As a rule, the amount of silicone polymer will be between about 0.5 and about 10.0 parts per million, while the amount of inhibitor used will be between 0.01% and 1.0%, and preferably between about 0.03% and about 0.3%. Obviously, amounts of silicone and/or inhibitor substantially greater than these relatively small amounts can be employed without lessening of the anti-foaming benefits of the invention. Accordingly, it will be understood that the use of such higher amounts is within the spirit and scope of the invention.

It is pointed out that all of the percentage amounts stated hereinabove and in the appended claims are on a weight basis.

Although the invention has been described herein in terms of specific embodiments and examples thereof, it is not intended that the scope thereof be limited in any way thereby, but only as indicated in the following claims.

What is claimed is:

1. A foam inhibited mineral oil composition comprising a major porportion of mineral oil, a minor amount, from about 0.5% to about 30%, of an oil-soluble detergent additive which normally increases the foam-forming tendency of said composition and as a foam-inhibiting combination (a) a minor amount, from about 0.5 to about 10 parts per million, of a dimethyl silicone polymer having a viscosity at 25° C. of from about 3.0 cs. to about 1,000,000 cs. and (b) a minor amount, from about 0.01% to about 1%, of an ethoxylated sorbitan monostearate containing from about 1 to about 25 ethylene oxide radicals per mole of ester.

2. A foam inihibited mineral oil composition comprising a major proportion of mineral oil, a minor amount, from about 0.5% to about 30%, of an oil-soluble detergent additive which normally increases the foam-forming tendency of said composition and as a foam-inhibiting combination (a) a minor amount, from about 0.5 to about 10 parts per million, of a dimethyl silicone polymer having a viscosity at 25° C. of from about 3.0 cs. to about 1,000,000 cs. and (b) a minor amount, from about 0.01% to about 1%, of an ethoxylated sorbitan monostearate containing 4 ethylene oxide radicals per mole of ester.

References Cited by the Examiner

UNITED STATES PATENTS

| 2,085,709 | 6/1937 | Steibert | 252—9.23 |
| 2,972,579 | 2/1961 | Delfel | 252—358 X |

OTHER REFERENCES

McBain et al., "Foaming of Aircraft-Engine Oils as a Problem in Colloid Chemistry—I," in Wartime Report NACA ARR No. 4105, National Advisory Committee for Aeronautics, September 1944, page 73 relied on.

Ross, "Chemical Anti-Foaming Agents," Chemical Industries, May 1949, pp. 757–759.

DANIEL E. WYMAN, *Primary Examiner.*

JULIUS GREENWALD, *Examiner.*